Patented June 3, 1952

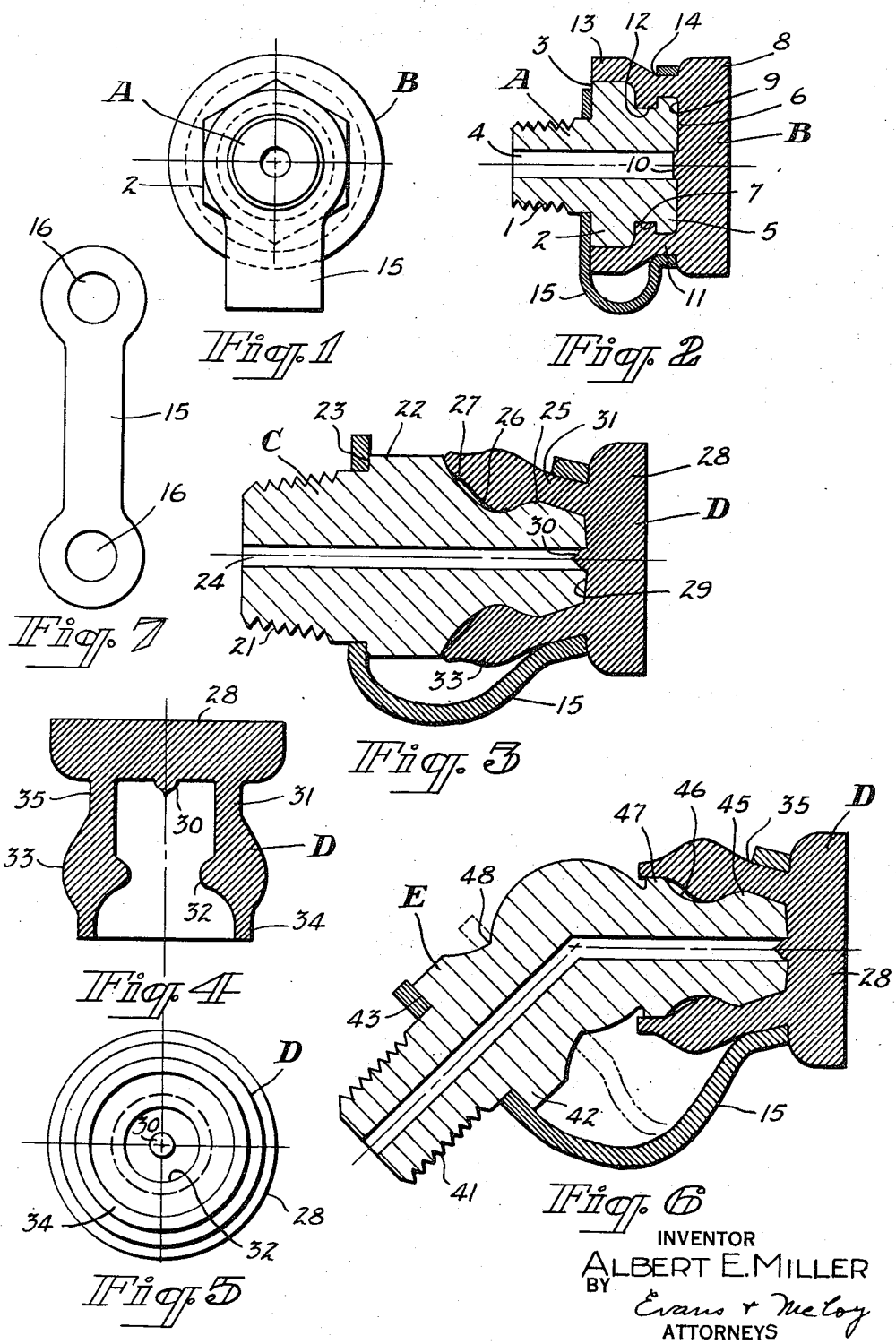

2,599,472

UNITED STATES PATENT OFFICE 2,599,472

PROTECTIVE DEVICE FOR LUBRICANT FITTINGS

Albert E. Miller, Lakeside, Ohio

Application March 27, 1948, Serial No. 17,557

3 Claims. (Cl. 184—105)

This invention relates to protective devices for grease gun attachment portions of lubricant fittings of the type commonly attached to the bearings of motor vehicles, the device including a cap adapted to protect the fitting against damage due to impacts, to seal the fitting and to prevent entry of dirt into the fitting.

Protective caps for the attachment portions of lubricant fittings are of small size and are frequently lost when removed to permit injection of lubricant into the fittings.

In order to prevent loss of the caps and to make it less likely that the attendant will forget to replace the caps, the present invention provides a simple and easily applied retaining strap which serves to support the cap on the fitting while it is detached from the grease gun receiving head, so that the cap can be quickly and easily replaced after injection of lubricant into the fitting.

With the above and other objects in view, the invention may be said to comprise the device as illustrated in the accompanying drawings hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is an end elevation of a lubricant fitting with the protective device of the present invention applied thereto;

Fig. 2 is an axial section through the fitting and protector shown in Fig. 1;

Fig. 3 is an axial section through a fitting of a form somewhat different from that shown in Fig. 1, showing a protective cap of modified construction;

Fig. 4 is an axial section through the cap shown in Fig. 3 detached from the fitting;

Fig. 5 is an end elevation of the cap;

Fig. 6 is a longitudinal section through a third form of fitting showing the protective cap shown in Figs. 3, 4 and 5 attached thereto; and Fig. 7 is a plan view of the cap retaining strap.

In Figs. 1 and 2 of the drawings the invention is shown applied to a fitting A having a threaded end portion 1 adapted to be screwed into a threaded opening in a bearing, the fitting having an enlarged hexagonal portion 2 outwardly of the threaded portion 1 that provides a flat inwardly facing shoulder 3. The lubricant fitting A has an axial passage 4 through which lubricant is introduced into the bearing and at its outer end is provided with a head 5 for attachment to a suitable grease gun for injecting lubricant into the fitting. The head 5 has a flat outer face 6 and between the head 5 and the enlarged hexagonal portion 2 the fitting has a restricted neck portion 7.

To protect the fitting against damage by impact with stones or the like thrown by the wheels of the vehicle and to seal the oil passage and prevent accumulation of dirt on the fitting, a protective cap B is provided that is preferably formed of elastic rubber having a relatively thick head portion 8 and an inner portion formed to provide a head receiving socket that has a flat bottom wall 9 that conforms to the flat end face 6 of the fitting. The bottom wall 9 has a central projection 10 that extends into the outer end of the passage 4 to seal the same. The socket portion of the cap is formed by a tubular wall 11 integral with the head 8 and of less diameter than the head 8 adjacent the head. The wall 11 is provided with an internal rib 12 which engages the restricted neck portion 7 of the fitting. An inner end 13 of the cap is of enlarged diameter adapted to be stretched over the enlarged portion 2 of the fitting. The head 8 and enlarged portion 13 of the tubular wall form an external groove 14 on the cap which is utilized to attach a flexible cap retaining strap 15. The strap 15 which is preferably formed of elastic rubber has openings 16 in the opposite ends thereof that are adapted to receive the cap and fitting. Each of the openings 16 in the elastic rubber strap provides a stretchable band that can be slipped over the cap or over the fitting. One end of the strap is engaged in the groove 14 of the cap and the opposite end of the strap is slipped over the inner threaded end portion 1 of the fitting as shown in Fig. 2. If the device is applied to the fitting before it is fastened to the bearing, the strap can be readily slipped over the inner threaded end 1 of the fitting and placed against the shoulder 3. If the protective device is applied to a fitting already installed the strap can be slipped over the outer end of the fitting into place between the shoulder 3 and the bearing. The strap 15 is long enough to permit the cap to be detached from the fitting and supports the cap adjacent the fitting while the grease gun is applied to the fitting in a position convenient for replacement on the fitting.

In Fig. 3 of the drawings a fitting C is shown that has a threaded inner end 21 and an enlarged intermediate portion 22 providing a shoulder 23 against which an end portion of the strap 15 may be placed. The fitting C has an axial passage 24 and a grease gun receiving head 25 at its outer end. The head 25 is rounded and of tapering form, tapering inwardly toward a restricted neck portion 26. The neck portion also is of rounded form and merges into a shoulder 27 at the outer end of the enlarged portion 22 of the fitting. A protective cap D is provided which has a thickened head 28 and a socket portion inwardly of the head provided with a bottom 29 that conforms to the outer end of the fitting and a central projection 30 that extends into the passage 24 to provide a seal. The socket portion of the cap has a tubular wall 31 which is of less diameter than the head 28 adjacent the head. The tubular wall 31 has an internal rib 32 of an internal diameter materially less than that of the neck portion 26 of the fitting that is adapted to engage in the neck portion of the fitting. The tubular wall is thickened exteriorally of the rib 32 by an external bead 33 of considerably greater width than the internal rib 32 so as to provide a strong elastic band that exerts a firm grip on the neck portion of the fitting. At its inner end the tubular wall 31 has a portion 34 of somewhat larger diameter than the outer portion of the tubular wall for engagement with the tapered shoulder 27 of the fitting. An external groove 35 is formed between the head 28 and the external bead 33 of the tubular wall which is adapted to receive one end of the flexible strap 15, the opposite end of the strap being fitted on the inner end portion 21 of the fitting and against the shoulder 23 so that it can be clamped between the fitting and the wall of the bearing to which the fitting is applied.

In Fig. 6 of the drawing the cap D and strap 15 shown in Figs. 3, 4 and 5 are shown applied to a fitting E of elbow-shape, the fitting E having an inner threaded end 41 and an enlarged portion providing a flat shoulder 43 against which one end of the strap 15 may be placed. The fitting E has a head 45 similar to the head 25 of the fitting C previously described and a neck portion 46 to receive the internal rib 32 of the cap. At the inner end of the neck portion of the fitting there is a circumferential rib 47 that is received by the enlarged inner end portion 34 of the tubular wall of the cap.

The fitting E has a restricted portion 48 outwardly of the enlargement 42 and if desired the end of the band can be placed into engagement with the restricted portion 48 of the fitting instead of into engagement with the shoulder 43. The end of the strap can be brought into engagement with the restricted portion 48 by forcing the strap over the outer end of the fitting or over the inner end thereof, the portion of the strap surrounding either of the holes 16 forming an elastic band which can be stretched sufficiently to pass over the enlargements of a fitting or over either enlarged end of the cap.

The internal rib 32 together with the external bead 33 provide a stiff contractile ring that engages the inner taper of the head of the fitting and exerts an axial pull in the cap to force the end portion of the cap into snug engagement with the end of the fitting, thereby sealing the lubricant passage so effectively that the check valves ordinarily employed in such fittings may be omitted.

The cap of the present invention is preferably made of a suitably compounded rubber that is oil resistant, such as a polychlroprene or a butadiene acrylonitrile copolymer.

It is to be understood that variations and modifications of the specific devices herein shown and described for purposes of illustration, may be made without departing from the spirit of the invention.

What I claim is:

1. A protecting and sealing device for application to a tubular lubricant fitting having a grease gun engaging head at its outer end, a restricted neck portion adjacent said head and a second restricted portion spaced inwardly from said neck portion comprising an elastic rubber cap having a relatively thick head and a socket portion of a size to stretch over and grip the head and neck of said fitting, said cap having an external groove, and a pliant elastic rubber strap provided with openings adjacent its ends to receive the cap and fitting and providing elastic bands adapted to grip the bottom of said external groove of the cap and the inner restricted portions of the fitting.

2. A protecting and sealing device for application to a tubular lubricant fitting having a grease gun engaging head at its outer end, a restricted neck portion adjacent said head and a second restricted portion spaced inwardly from said neck portion comprising an elastic rubber cap having a relatively thick head and a socket portion of a size to stretch over and grip the head and neck of said fitting, said cap having a relatively thick head and a tubular socket portion integral with its head, the end of said socket portion adjacent said cap head being of an internal diameter less than the external diameter of the head of the fitting and having a thickened portion of greater external diameter spaced from said cap head, and a pliant elastic rubber strap having end portions provided with openings to receive said cap and fitting and providing elastic bands adapted to grip the cap between said thickened portion and the head thereof and the inner restricted portion of the fitting.

3. A protecting and sealing device for application to a lubricant fitting having an axial lubricant passage to its outer end and a grease gun attachment portion provided with a restricted neck spaced from the outer end and a head tapering inwardly to the neck and outwardly to said outer end comprising a one-piece elastic rubber cap having a relatively thick head portion at its outer end and a socket to receive the outer end of the fitting provided with a bottom that conforms to the outer end of the fitting and a tubular wall, the portion of said tubular wall engaging with the head of the fitting being of an internal diameter less than the external diameter of said head, said tubular wall being formed to provide a thickened neck gripping portion spaced from the head of the cap that comprises an internal bead of less internal diameter than said neck engageable with said neck gripping portion of the fitting and an external bead surrounding the internal bead and of greater width to provide a strong gripping band of elastic rubber in said neck gripping portion, said internal bead being engageable with the inwardly tapering portion of the head whereby the gripping band exerts an axial pull on the head engaging portions of the cap.

ALBERT E. MILLER.

REFERENCES CITED

The following references are of record in the file of this patent:

UNITED STATES PATENTS

| Number | Name | Date |
| --- | --- | --- |
| 1,395,406 | Frang | Nov. 1, 1921 |
| 1,435,214 | Coombs | Nov. 14, 1922 |
| 1,546,159 | Wippler | July 14, 1925 |
| 1,595,787 | Johnson | Aug. 10, 1926 |
| 1,604,442 | Zerk | Oct. 26, 1926 |
| 2,379,529 | Kennedy | Juy 3, 1945 |

FOREIGN PATENTS

| Number | Country | Date |
| --- | --- | --- |
| 205,386 | Great Britain | 1923 |
| 535,616 | Great Britain | 1941 |